Figure 1:
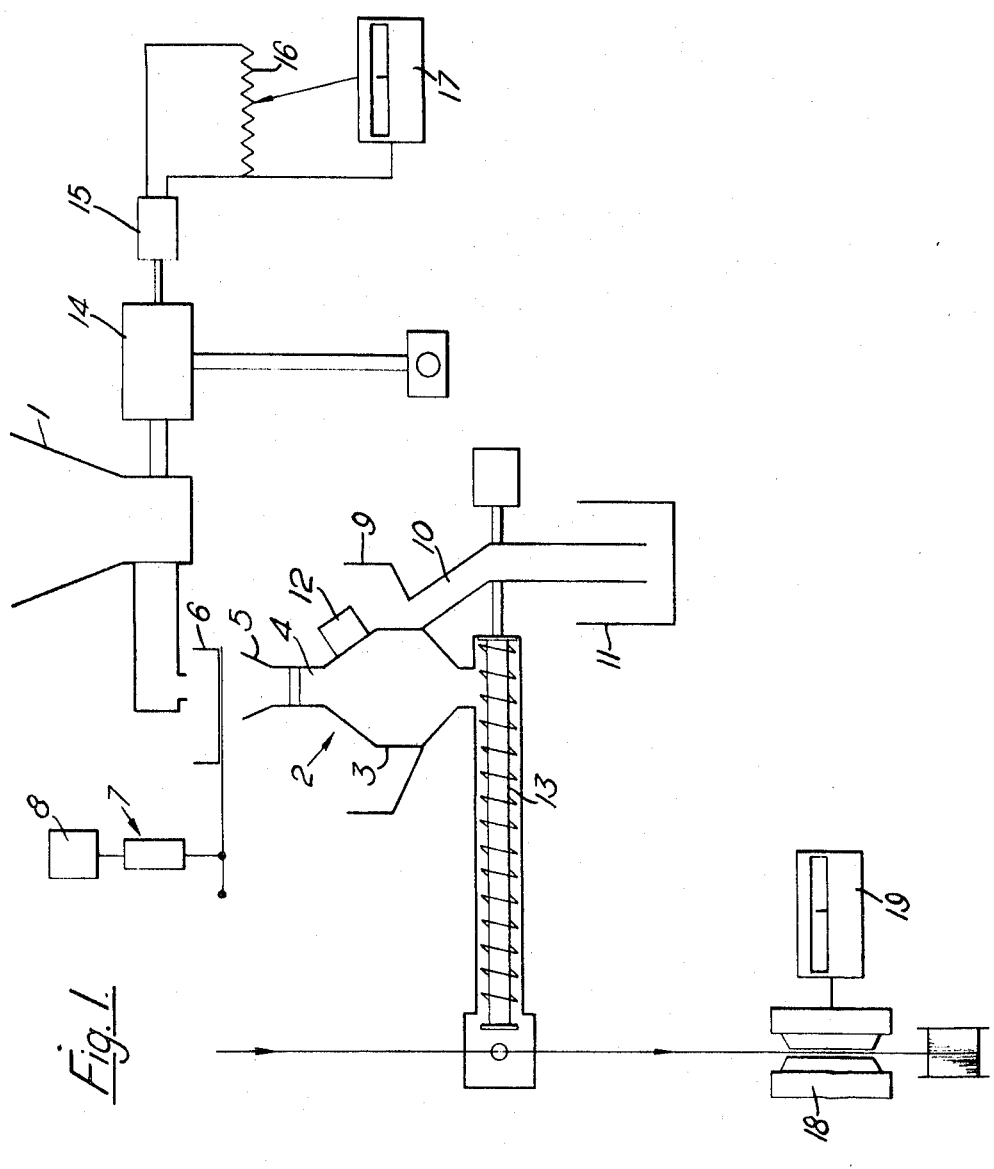

United States Patent

[11] 3,624,025

[72] Inventor Reginald James Twist
 St. Helens, England
[21] Appl. No. 854,906
[22] Filed Sept. 3, 1969
[45] Patented Nov. 30, 1971
[73] Assignee British Insulated Callender's Cables Limited
 London, England
[32] Priority Sept. 9, 1968
[33] Great Britain
[31] 42,815/68

[54] METHOD AND APPARATUS FOR OBTAINING CONSTANT CROSS SECTION EXTRUDATES WITHOUT MAKING MEASUREMENTS THEREON
5 Claims, 3 Drawing Figs.

[52] U.S. Cl. .................................... 264/40,
 18/2 HA, 18/12 SH, 18/12 TC, 18/13 C, 264/174
[51] Int. Cl. .................................... B29f 3/06, B29f 3/10
[50] Field of Search ........................... 264/40, 174, 176; 18/30 FH, 30 GH, 2 HA, 12 SH, 12 TC, 13 C; 222/56, 64, 108, 109, 156, 157; 25/103

[56] References Cited
UNITED STATES PATENTS

| | | | |
|---|---|---|---|
| 2,568,332 | 9/1951 | Genovese ................. | 18/12 SH |
| 3,286,302 | 11/1966 | Doering ................... | 18/2 HA |
| 3,391,232 | 7/1968 | Jackson .................... | 264/40 |

Primary Examiner—Robert F. White
Assistant Examiner—J. H. Silbaugh
Attorney—Webb, Burden, Robinson and Webb ABSTRACT: The operation of an extrusion machine is controlled to obtain a constant cross section in the extrudate without the need to make measurements upon it. The machine is fed by a controlled feeding device which discharges into a reservoir that has a capacity sufficient to ensure that the machine is choke fed, and the reservoir is provided with means, such as a narrow neck, to amplify variations in the level so that unacceptable changes are immediately indicated. Signals representing a rate of feed to the reservoir and the line speed are obtained and the relationship between the feed rate and the speed of the machine and between the feed rate and the line speed are adjusted respectively to maintain a constant level in the reservoir and to establish a constant relationship so that the rate of extrusion of material is kept constant.

METHOD AND APPARATUS FOR OBTAINING CONSTANT CROSS SECTION EXTRUDATES WITHOUT MAKING MEASUREMENTS THEREON

This invention relates to a method of and apparatus for controlling an extrusion process with the object of producing an extrudate of substantially uniform cross-sectional area.

The invention is applicable to extrusion methods in which during extrusion the linear speed of travel of the extrudate and/or the rate (i.e. volume or weight per unit time) at which the material to be extruded is fed into the extrusion machine from a controlled feeding device can be adjusted.

The invention is especially concerned with the extrusion of a tubular covering of rubber or thermoplastics material onto a cylindrical core, in which the linear speed of the extrudate as finally formed is equal to the speed at which the core passes through the machine. When extruding sections not formed as tubular coverings on a core, the linear speed of travel of the extrudate as finally formed is considered to be the speed at which it is taken up, e.g. by a capstan, an endless belt haul-off, or a takeup drum, from the extrusion machine after it has been cooled, if necessary; for simplicity this speed and the core speed when tubular coverings are being formed on a core will each be referred to generically as the "line speed."

In the method in accordance with the invention the material is fed from a controlled feeding device into a reservoir incorporated in the inlet of the extrusion machine of a capacity sufficient to ensure that the machine is choke fed; the reservoir is provided with means for amplifying variations in the level of the material therein such that unacceptable variations which are outside the tolerances of the system are immediately indicated, visually or otherwise; a signal (the "feed signal") representing the rate of feed from the feeding device into the reservoir is obtained; a signal representing the line speed is obtained; and the rate of feed and/or the line speed are adjusted in accordance with the said signals in a sense and to an extent tending to maintain the level of material in the reservoir constant and tending to maintain a constant relationship between the feed signal and line speed such that the cross-sectional area of the extrudate remains substantially constant.

In order to amplify variations in the level of the material in the reservoir, it is preferably provided with a relatively narrow inlet neck of uniform cross-sectional area over a length sufficient to amplify and indicate visually or otherwise variations of level outside the tolerances of the system.

In one preferred method in accordance with the invention, the line speed that will give a desired cross-sectional area of extrudate is computed from the feed signal, e.g. by an arithmetic logic unit when the relationship between the signal and feed rate is linear, and the line speed is adjusted manually or automatically to match the computed value.

In another method in accordance with the invention the actual weight or volume per unit length of the extrudate is computed by dividing the feed signal by a signal representing the line speed, e.g. obtained from a tachogenerator or other transducer driven by the takeup capstan, and the computed value of the weight or volume per unit length is matched with the weight or volume per unit length actually required, by adjusting the line speed and/or feed speed, automatically or manually.

In both methods the adjustments made are such that the level of material in the reservoir neck remains substantially constant.

The material may be fed into the reservoir by any motor driven weight or volume dispenser, but (especially where variations in the bulk density are likely to occur in the material supplied to the feeder) a weight dispenser is preferable. A weight dispenser of the kind in which the material flows from a hopper through a gate onto a moving belt and the width of the gate is automatically adjusted in accordance with the weight of material on a portion of the belt to keep that weight substantially constant has been found satisfactory. A weight dispenser of this type is available from Wallace & Tiernan Limited of Tonbridge, Kent, England or from Wallace & Tiernan Inc., Industrial Products Division, of Belleville, N.J., U.S.A. and is known as the Superweigh electric gravimetic feeder. An alternative type of weight dispenser is similar to that just described except that the gate feed is replaced by an infinitely variable amplitude vibrator feed. A dispenser of this type which utilizes a load cell (rather than a balance arm) to weigh the material on the belt and which has a two-term control system is currently being developed by Locker Industries Limited of Warrington, England, and is expected to be particularly accurate. Reasonable results can however be obtained using a volume dispenser, for example the vibration-packed revolving screw feeder available from Simon Handling Engineers Limited of Cheadle Heath, Stockport, England or from Vibra Screw Feeders Inc., of Clifton, N.J., U.S.A. and known as the Vibra Screw feeder. When a volume dispenser (or an uncalibrated weight dispenser) is used, sampling means may be provided by which the actual feed rate can be measured to enable the device used for computing the desired line speed or the weight per unit length of the extrudate to be calibrated.

The invention will be further illustrated by a description by way of example of apparatus and methods of operating it. Three forms of apparatus are shown diagrammatically in the three figures of the accompanying drawings.

Each method to be described is for forming a tubular covering of uniform cross-sectional area of a thermoplastics material on a cable core by means of a rotating screw extruder of conventional form. Referring initially to any one of FIGS. 1 to 3, the thermoplastics material is fed in granular form to the extruder from a motor driven weight or volume dispenser 1 and passes under gravity into the extruder hopper 2, which is enlarged to form a reservoir 3 for the granular material. The inlet of the reservoir is a comparatively narrow cross section glass neck 4 formed with a funnel shaped inlet 5 in its upper end.

If a volume dispenser is used, there is preferably a gap between the feeder outlet and the inlet to the reservoir into which it is possible to interpose the container 6 of a sampler, the function of which is to measure the rate of output of the feeder. It may for example consist of scales with a pan of appropriate size to take the sample coupled to a timer 8 in such a way that the pan remains in the path of the stream of granular material for a fixed time only, e.g. 1 minute.

The hopper 2 is surrounded by a skirt 9 to receive any overflow from its inlet and this skirt is provided with an outlet 10 to a receptacle 11 into which excess granular material can pass. The hopper is also provided with a vibrator 12 to ensure even flow of the granular material through the reservoir into the extruder inlet of the extruder 13.

In the apparatus of FIG. 1, the drive motor 14 for the feeder also drives a tachogenerator with its output connected through a calibrating potentiometer 16 to a voltmeter 17. The voltmeter is provided with a set of changeable scales marked to indicate the speed of the cable core for use as hereinafter described.

The sheathed core is taken-up by a capstan 18 in the normal way and an indicator 19 of the core speed is provided.

Although in this example the combination of the potentiometer and voltmeter, to which the output of the tachogenerator (the "feed signal") is applied to produce the speed signal constitutes a simple arithmetic unit having a substantially linear characteristic, other more complex methods of computing the required core speed for each value of the feed speed can be used should it be necessary to take into account nonlinear functions of the feed system.

The sampler can be provided with automatic operating means to cause it to take and weigh samples at regular intervals and then automatically to effect calibration of the feed signal by means of the variable potentiometer or other calibrating device.

Figure 2:
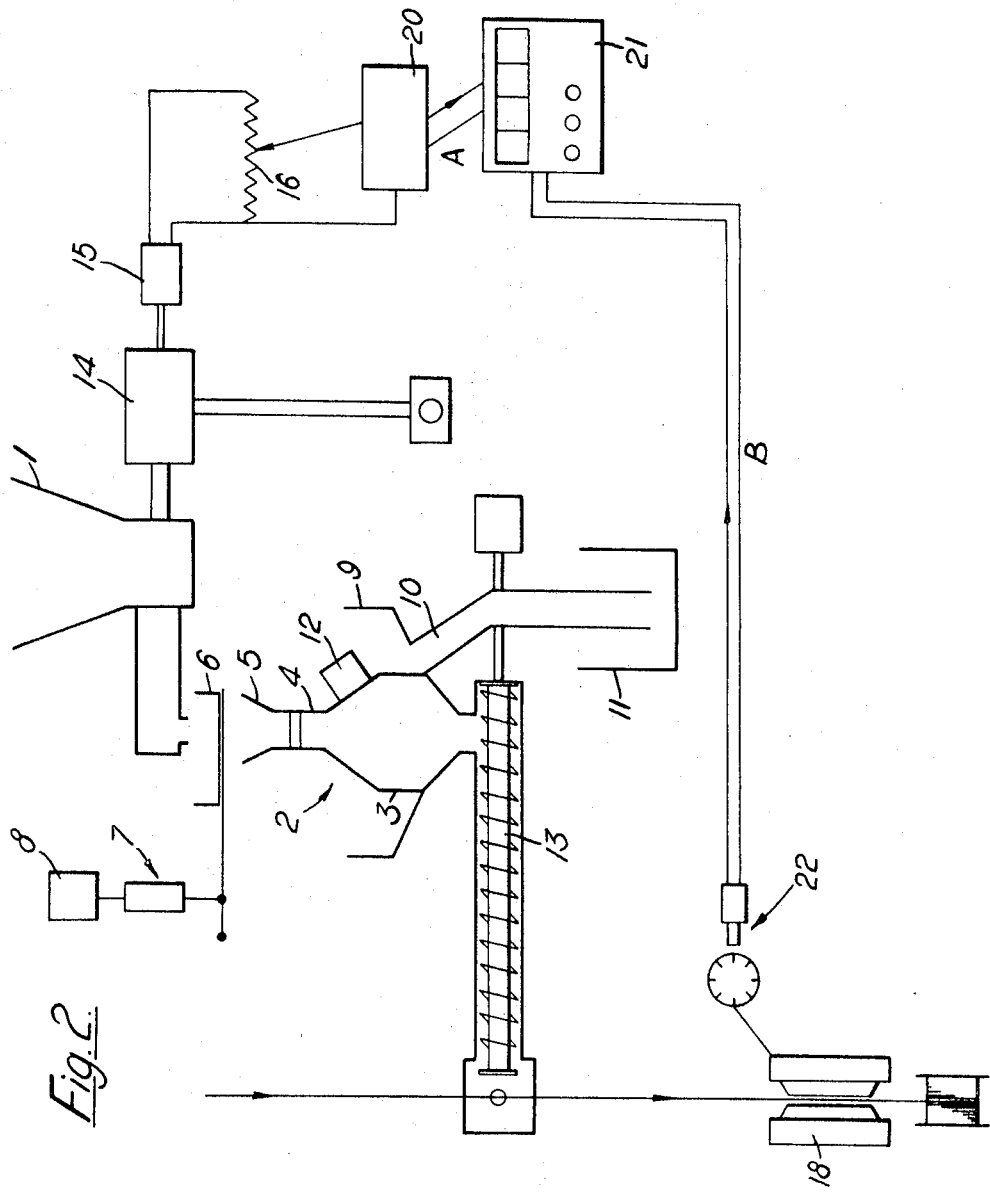

FIG. 2 shows a modification of the system shown in FIG. 1 in which a digital feed signal (signal A) derived from an analogue/digital converter 20 connected to the potentiometer 16 and a digital signal (B) representing the line speed are fed into a display unit that will show signal A, signal B or signal A/signal B. Signal B may for example be obtained from a transducer pickup driven by the haul-off capstan.

The display unit can be calibrated to show actual line speed, actual feed rate and the actual weight per unit length of material being applied to the core, the latter value being proportional to the ratio signal A/signal B.

Figure 3:
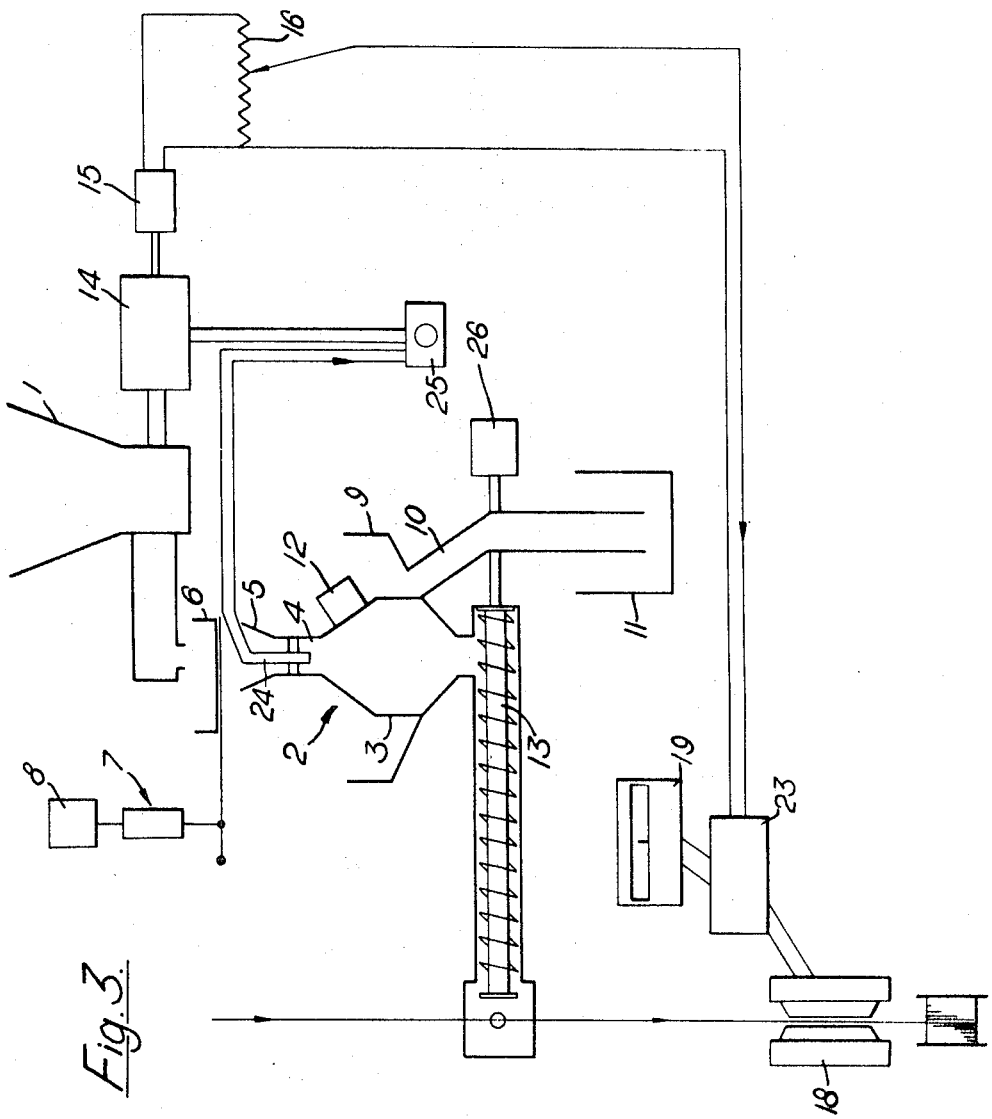

FIG. 3 shows an automatic control system in which the feed signal for potentiometer 16 is applied directly to a haul-off speed control 23 and the hopper level indicator (in this case a capacitance probe 24) applies a control signal to a speed control 25 for the feed motor 14. It could alternatively apply a control signal to the extruder drive motor 26.

When applying the method in accordance with the present invention, the various forms of apparatus described are utilized as follows.

When using manual control the feed system is started, but not the extruder, and after 30 seconds running to allow stable condition to develop the sampling device is used (if necessary) to calibrate the rate of delivery from the feeder. If the production is being controlled by a display of weight per unit length (FIG. 2 apparatus) the procedure is as follows.

The delivery calibration potentiometer is adjusted so that the display of delivery equals the actual delivery. If there is now delay for any reason in starting the extruder, the hopper reservoir will overflow into the catchment skirt but this is of no consequence as the material is still in its original form and may be returned to the feed system.

The extruder started and its speed adjusted so that its output balances the input and a steady level is maintained in the glass neck.

The haul-off system is started and when using the apparatus of FIG. 2 the display changed to that in which the delivery signal is divided by the haul-off signal. The speed of the haul-off is adjusted till the required weight per unit length is displayed. If for example a caterpillar haul-off system is used, during this procedure a 'lead' rope would be positioned through the cooling system, held at the head, and through the open tracks of the caterpillar so that in fact it does not move.

The cable is passed through the head, joined to the lead rope, and the caterpillar tracks are closed. The core is now being covered at the rate shown in the display, provided that the level in the glass neck remains unchanged.

If the system is now accelerated to the maximum possible extruder screw speed and the haul-off has been accelerated in the correct ratio, if the extruder output is not linear with respect to its r.p.m. the weight per unit length may have changed.

In the manual system the feed rate will not have changed during acceleration and the level in the neck will have fallen and some of the reservoir capacity will have been used up. The feed system is now accelerated to full output to 'catch up' as quickly as possible to the original level in the neck. As soon as a stable level has been reestablished, the display will show the actual weight per unit length now being applied. If this differs from that required, the haul-off speed is adjusted to reestablish the value required.

With this procedure any changes in the neck level are corrected by changing the feed rate into the system rather than changing the extruder r.p.m. but of course both have the same effect. When the feed rate has been changed, it will be necessary to adjust the haul-off speed to reestablish the correct weight per unit length.

In the apparatus of FIG. 1 which provides for manual control by a display of required line, (or haul-off) speed, the procedure is essentially similar but the original calibration is used to provide a display of the correct line speed by the use of the potentiometer. The actual haul-off speed is manually adjusted to the correct value shown on the display. Any change in the feed rate required to maintain the neck level will change the display to show the appropriate haul-off speed and the haul-off speed will be adjusted accordingly.

The advantage of the "weight per unit length" display is that any differences between design values and actual required values, particularly in the case of different shapes or sections, are detected very quickly and the actual values may be recorded for costing purposes.

The method in accordance with the invention is especially applicable when it is difficult to measure the cross-sectional dimensions of an extruded section or the wall thickness of a tubular covering on a core, during extrusion, and/or when the extrusion equipment is nonlinear, that is there is a nonlinear relationship between the screw speed and the output of the extruder. The first of these situations often arises when the extruded material is P.V.C., since measurements of diameter etc. using capacitance monitoring apparatus tend to be unreliable.

What I claim as my invention is:

1. A method of controlling an extrusion process without making measurements upon the extrudate comprising:
    a. feeding the material to be extruded from a controlled feeding device into a reservoir incorporated in the inlet of the extrusion machine of a capacity sufficient to ensure that the machine is choke fed;
    b. providing the reservoir with means for amplifying variations in the level of the material therein such that unacceptable variations which are outside the tolerances of the system are immediately indicated;
    c. obtaining a feed signal representing the rate of feed from the feeding device into the reservoir;
    d. obtaining a signal representing the line speed; and
    e. simultaneously obtaining
        i. a relationship between the rate of feed and the speed of the extrusion machine to maintain the level in the reservoir constant and
        ii. a relationship between the speed of the extrusion machine and the line speed to maintain a constant relationship between the feed signal and line speed signal and hence to maintain the cross-sectional area of the extrudate substantially constant.

2. A method as claimed in claim 1 in which the controlled extrusion process is the application of an extruded covering to a core.

3. A method of controlling an extrusion process without making measurements upon the extrudate comprising:
    a. feeding the material to be extruded from a controlled feeding device into a reservoir incorporated in the inlet of the extrusion machine of a capacity sufficient to ensure that the machine is choke fed;
    b. providing the reservoir with means for amplifying variations in the level of the material therein such that unacceptable variations which are outside the tolerances of the system are immediately indicated;
    c. adjusting the relationship between the speed of the feeding device and the speed of the extrusion machine to maintain the level of the material in the reservoir substantially constant;
    d. obtaining a feed signal representing the rate of feed from the feeding device into the reservoir;
    e. computing from the feed signal the line speed that will give a desired cross-sectional area to the extrudate;
    f. obtaining a signal representing the actual line speed; and
    g. adjusting the actual line speed to match the computed value while further adjusting the aforesaid relationship, if necessary, to maintain the said constant level in the reservoir.

4. A method of controlling an extrusion process without making measurements upon the extrudate comprising:
    a. feeding the material to be extruded from a controlled feeding device into a reservoir incorporated in the inlet of the extrusion machine of a capacity sufficient to ensure that the machine is choke fed;
    b. providing the reservoir with means for amplifying variations on the level of the material therein such that unacceptable variations which are outside the tolerances of the system are immediately indicated;
    c. obtaining a feed signal representing the rate of feed from the feeding device into the reservoir;

d. computing the actual quantity per unit length of extrudate by dividing the feed signal by a signal representing the line speed; and
e. simultaneously establishing
   i. a relationship between the speed of the feeding device and the speed of the extrusion machine that maintains the level of the material in the reservoir substantially constant and
   ii. a relationship between the rate of feed and the line speed that matches the computed value with the quantity per unit length actually required.
5. Extrusion apparatus comprising:
a. an extrusion machine having incorporated in its inlet a reservoir of a capacity sufficient to ensure that the machine is choke fed;
b. a feeding device for supplying extrudible material to the reservoir;
c. means for amplifying variations in the level of the material in the reservoir and for obtaining an indication of any variation in said level that is outside the tolerance of the system;
d. means for obtaining a feed signal representing the rate of feed from the feeding device into the reservoir;
e. means for obtaining a signal representing the line speed;
f. means responsive to said indication to adjust the relationship between the said feed signal and the speed of the extrusion machine to maintain said level substantially constant; and
g. means compatible with said means (f) and responsive to said signals to adjust the relationship between the feed rate and the line speed to maintain the product of said signals, and hence the cross section of the extrudate, substantially constant.

* * * * *